United States Patent Office 2,727,831
Patented Dec. 20, 1955

2,727,831

METHOD OF RENDERING POLYSTYRENE ARTICLES STATIC-FREE AND RESULTING ARTICLE

Robert R. Dixon, Mansfield, Ohio, and David E. Baldwin, Pittsburgh, Pa., assignors to Westinghouse Electric Corporation, East Pittsburgh, Pa., a corporation of Pennsylvania No Drawing. Application October 9, 1952,
Serial No. 313,984

4 Claims. (Cl. 117—62)

This invention relates to members of polystyrene plastics having substantialy static-free surfaces, and to processes for producing the same.

At the present time, a great variety of members are produced from polystyrene by injection molding, extruding and by other processes. Such members are employed as refrigerator parts, lamp fixture members, decorative items, radio and television parts, toilet articles, novelties and so on. The members may comprise either transparent polystyrene, or pigmented or colored polystyrene, and may include small amounts of plasticizers, lubricants and other modifying plastics.

It is well known to those working in the art that members comprising polystyrene acquire or build up electrostatic charges of high magnitude on their surfaces whereby dust and dirt accumulate on the exposed surfaces of these polystyrene members rapidly and in a large amount. Such accumulated dust is undesirable for many reasons. In the shop, polystyrene members will readiy accumulate dust and grit, so that when assembled into various devices, the grit or dust will cause scratched surfaces and improper assembly of members. Therefore, the polystyrene members must be cleaned carefully before they are assembled, lest damage be done to their surfaces. The devices comprising polystyrene members must be carefully packed for shipment in order to protect the surfaces from excessive dust accumulation. The household user of polystyrene plastics finds it necessary to clean them at frequent intervals in order that they may maintain their best appearance and surface condition. Thus, lighting fixtures having polystyrene trim and reflecting or light diffusing members and polystyrene windows, will accumulate so much dirt on the surfaces in a day or two that the useful transmitted light will be reduced very appreciably. In appliances used in contact with food, the polystyrene members must be cleaned frequently for sanitary reasons.

It has been suggested that coatings of various kinds be applied to the exposed surfaces of members comprising polystyrene plastics in order to render them static free. However, such coatings are of temporary value and usually are removed when the polystyrene member is washed for the first time. Some of these protective coatings peel or separate readily, and therefore, their usefulness is limited.

The object of this invention is to provide members of polystyrene whose surface has been treated to render them substantially permanently static free.

Another object of the invention is to provide a process for treating polystyrene members to render them substantially permanently static free.

Other objects of the invention will, in part, be obvious and will, in part appear hereinafter.

We have discovered that members comprising polystyrene may be treated (a) by applying to the exposed surface thereof certain concentrated sulfuric acid solutions to sulfonate the surfaces, (b) draining the sulfuric acid from the treated surfaces for a period of time and rinsing, and (c) then applying to the sulfonated surfaces an alkali to produce the sulfonic acid salt of polystyrene, whereby the surfaces will no longer pick up any substantial electrostatic charge. Members so treated will no longer attract dust and grit, even when exposed to dusty atmospheres for prolonged periods of time. The surfaces may be washed and cleansed in the normal way without imparing the treatment.

Members comprising polystyrene as the main resinous constituent, including members prepared by casting, molding, extruding or by other processes, and containing substantial amounts of pigments, dyes, plasticizers and modifying resins, have been successfully treated by the following process. The polystyrene members on which all of the surface finishing operations, such as sanding, polishing and the like, have been completed, are immersed in a sulfuric acid solution having from 80% $H_2SO_4$ to 10% fuming acid concentration, the solution being at a temperature of from 55° C. to 90° C. Sulfuric acid above 10% fuming acid will discolor and etch the polystyrene surfaces. The time of application of the acid need only be a few seconds with the strongest acid solutions. The time of application of the acid may be prolonged considerably to as much as an hour or more with the weakest solutions and lowest temperatures. With the weakest acid concentration and lowest temperatures, it is recommended that the application of the acid be at least 15 minutes for any substantial benefit. The acid may be applied by spraying, flowing, or otherwise, over the surfaces of the member, though immersion will ordinarily be most convenient.

The immersion in the acid sulfonates the surface of the polystyrene. In order to avoid deterioration of the surface gloss and smoothness of the surfaces of the polystyrene member, it is necessary that the application of the acid be limited so that sulfonation to an appreciable depth does not occur. Therefore, with 5% to 10% fuming $H_2SO_4$, the acid should be applied for not over 10 seconds, while with 80% $H_2SO_4$ solution at 70° C. the time of application may be 15 to 30 minutes without causing loss of gloss. Usually the acid treated surfaces of the polystyrene acquire a slimy mixture which renders them unsatisfactory for use.

Thereafter, the polystyrene members must be drained for at least 30 seconds, and preferably for 1 to 2 minutes in order to remove most of the sulfuric acid from the surfaces. If the acid is not drained and the members are rinsed at once with water, a mottled or etched surface condition occurs. The acid treated and drained member is thereafter rinsed with water. The polystyrene member is then treated with an alkali in order to produce the sulfonic acid salt. This alkali step is critical since it eliminates the slimy texture. Suitable alkalis are aqueous solutions of alkali metal and alkaline earth metal hydroxides and carbonates, such as sodium hydroxide, potassium hydroxide, potassium carbonate, and calcium hydroxide (lime water), amines such as triethanolamine, and quaternary ammonium compounds such as choline. Sodium hydroxide will ordinarily be found to be the most convenient alkali for this treatment. The concentration of the alkali is not critical, though an appreciable concentration should be present to secure the most rapid results. In a 1 N sodium hydroxide solution, one minute immersion has been found to produce an adequate result. Members may be left in the alkali almost indefinitely without any undesirable results. The sodium hydroxide or other alkali solution may be applied to the surface of the member by spraying, flowing or immersion. Thereafter, the treated member is rinsed and dried, and is ready for use. The following examples illustrate the practice of the invention.

*Example I*

A member comprising clear polystyrene was dipped in aqueous sulfuric acid of 93% $H_2SO_4$ concentration at a temperature of 70° C. for five minutes. The member was withdrawn and drained for a period of two minutes, rinsed with clear water and then immersed in 1 N potassium hydroxide solution for one minute. The member was withdrawn, rinsed with clear water and wiped dry. The treated member was found to be substantially static free, even when rubbed vigorously with a dry cloth. It was as transparent as an untreated clear polystyrene member. The member was washed repeatedly with soap and water, and its static-free properties were found to be unaffected thereby. When exposed to a dusty atmosphere, along with a similar member that had not been so treated, there was evident a marked difference in the dust accumulated on the members. The member treated in accordance with this process did not accumulate any appreciable amount of dust, even after several weeks standing, and the only dust that had accumulated thereon was mechanically precipitated dust on horizontal surfaces that was readily blown off. The other member was clouded by the heavy accumulation of dust. The dust could not be removed by blowing and could only be removed by wiping with a cloth or washing.

*Example II*

A molded member, comprising polystyrene, titanium dioxide pigment approximately 10% by weight, and a plasticizer amounting to 5% by weight, was treated in aqueous 96% sulfuric acid solution at a temperature of 70° C. In approximately two minutes, the member had been adequately sulfonated. The member was then drained for one minute, rinsed, and treated in 1 N sodium hydroxide solution for one minute. After rinsing and drying, the molded member was found to be substantially static free. The surface of the member was found to be unaffected by treatment with various washing solutions comprising a variety of detergents. When this member was suspended along with a similar untreated member in a room, the untreated member in a few days had acquired enough dust to give it a strongly gray appearance, whereas the other member appeared as white and clean as it had originally. Even after several weeks, the treated member had no significant amount of dust accumulated thereon, and any specks of dust that had fallen on the horizontal surfaces were easily blown away by a puff of the breath, whereas the other member had to be washed to render it reasonably clean.

We have found that in some cases polystyrene members embodying copolymers of polystyrene, such, for example, as a mixture of 20% of butadiene-styrene copolymers and 80% polystyrene, may discolor slightly on being sulfonated. Usually, a yellow tinge is imparted to the treated surfaces. We have found that the yellowing of the polystyrene member can be readily cleared by treating the sulfonated member with a bleaching agent selected from the group consisting of hypochlorites and hydrogen peroxide solutions. Prolonged treatment in a 5% aqueous solution of sodium hypochlorite will completely eliminate any yellowing without affecting the anti-static properties of the surfaces; while fifty percent hydrogen peroxide solution at 70° C. will eliminate the yellowing in from fifteen to thirty minutes. The following example is illustrative of this treatment.

*Example III*

A member, comprising as its resinous constituents 85% of polystyrene and 15% of a butadiene-styrene copolymer, the resins being admixed with 15% by weight of white pigment and molded into a refrigerator door panel, was immersed in 96% sulfuric acid at 65° C. for five minutes. The treated door was then drained for two minutes, rinsed and immersed in milk of lime solution for three minutes. The door panel was then rinsed in clear water and wiped dry. The door panel appeared slightly yellow after the treatment. It was then dipped for thirty minutes in a 50% hydrogen peroxide solution at a temperature of 70° C. When removed from the hydrogen peroxide solution and rinsed, it was again found to be clear white in appearance. The door was found to be substantially static free, and when tested in comparison with untreated door panels, was found to accumulate no appreciable amount of dust over several weeks time. Even vigorous wiping with a dry cloth failed to change its static-free characteristics. The treated surface was not affected by the washing and wiping to which it would be normally expected to be subjected.

The treatment carried out in accordance with the present invention does not affect the surface gloss or physical appearance of polystyrene members. Inasmuch as sulfonated polystyrene, as mentioned in Patent 2,533,210, is a water soluble compound, it is an unexpected feature of the present invention that the surfaces of molded members treated in accordance with the present invention are resistant to and substantially unaffected by water. We have found that the members of this invention may be immersed in water for long periods of time without affecting the surface of the molded members.

We have found that the process of this invention cannot be successfully applied to molding powders previous to the forming of molded members therefrom. Molding powders when treated with sulfuric acid, as described herein and then molded, result in articles that build up and acquire electrostatic charges just as much as will untreated polystyrene.

It will be appreciated that if the surface of the members is abraded or removed to an appreciable depth that there will be exposed untreated polystyrene that will build up electrostatic charges and will accumulate dust. Therefore, the surfaces of the members should not be subjected to sanding, machining or the like, after the treatment.

It will be understood that the above description is illustrative and not limiting.

We claim as our invention:

1. In the process of rendering substantially permanently static free the surfaces of a member comprising polystyrene as the main resinous constituent, the steps comprising applying to the surfaces of the member a sulfuric acid solution of from 80% $H_2SO_4$ to 10% fuming acid concentration, the acid being at a temperature of from 55° C. to 90° C. and applied to the surfaces for a period of time short of causing etching, the time corresponding to 5 minutes for 93% sulfuric acid at 70° C., and 2 minutes for 96% sulfuric acid at 70° C., whereby only a thin layer of polystyrene at the treated surfaces is sulfonated, the main body of polystyrene in the member remaining unaffected, draining the member for at least 30 seconds, and thereafter applying to the sulfuric acid treated surfaces an alkali to produce the sulfonic acid salt of polystyrene, the surfaces of the member so treated being substantially static free.

2. The process of claim 1 wherein the applied sulfuric acid is drained for a period of between one and two minutes, rinsed away with water before treatment with alkali, and the alkali is also rinsed off the surfaces of the member with water.

3. The process of claim 1 wherein the member after the application of alkali is treated with a bleaching agent selected from the group consisting of hypochlorite and hydrogen peroxide solutions for a period of time to bleach out any yellowness that may be present as a result of the previous steps.

4. A member comprising a resinous body, the resinous body comprising mainly styrene polymer, and a thin surface layer only of the resinous body comprising essentially the alkali salt of sulfonated polystyrene whereby the member is essentially permanently static free, the member being produced by the process of claim 1.

References Cited in the file of this patent

UNITED STATES PATENTS

| | | |
|---|---|---|
| 2,400,720 | Staudinger | May 21, 1946 |
| 2,446,536 | Hardy | Aug. 10, 1948 |
| 2,604,461 | Roth | July 22, 1952 |